US012359100B2

(12) United States Patent
Karrer et al.

(10) Patent No.: US 12,359,100 B2
(45) Date of Patent: Jul. 15, 2025

(54) SYSTEM FOR PRODUCING A SEALING COMPOUND FOR INSULATING GLASS

(71) Applicant: IGK ISOLIERGLASKLEBSTOFFE GMBH, Hasselroth (DE)

(72) Inventors: Randolf Karrer, Seligenstadt (DE); Nikita Polikarpov, Hanau (DE); Michael Vollrath-Rödiger, Frankfurt (DE)

(73) Assignee: IGK ISOLIERGLASKLEBSTOFFE GMBH, Hasselroth (DE)

( * ) Notice: Subject to any disclaimer, the term of this patent is extended or adjusted under 35 U.S.C. 154(b) by 507 days.

(21) Appl. No.: 17/600,934

(22) PCT Filed: Mar. 31, 2020

(86) PCT No.: PCT/EP2020/059132
§ 371 (c)(1),
(2) Date: Oct. 1, 2021

(87) PCT Pub. No.: WO2020/201287
PCT Pub. Date: Oct. 8, 2020

(65) Prior Publication Data
US 2022/0195263 A1 Jun. 23, 2022

(30) Foreign Application Priority Data
Apr. 3, 2019 (DE) ............... 10 2019 204 773.4

(51) Int. Cl.
*C09J 11/04* (2006.01)
*C08L 75/04* (2006.01)
*C08L 75/14* (2006.01)
*C09J 123/00* (2006.01)
*C09J 175/04* (2006.01)
*C09J 181/04* (2006.01)
*E06B 3/673* (2006.01)

(52) U.S. Cl.
CPC ............... *C09J 11/04* (2013.01); *C08L 75/04* (2013.01); *C08L 75/14* (2013.01); *C09J 123/00* (2013.01); *C09J 175/04* (2013.01); *C09J 181/04* (2013.01); *E06B 3/67343* (2013.01)

(58) Field of Classification Search
CPC ........ C09J 11/04; C09J 175/04; C09J 123/00; C09J 181/04
See application file for complete search history.

(56) References Cited

U.S. PATENT DOCUMENTS

| 8,865,817 | B2 | 10/2014 | Futscher | |
|---|---|---|---|---|
| 9,873,820 | B2 | 1/2018 | Hudson | |
| 10,370,523 | B2 * | 8/2019 | Chao | C08L 75/08 |
| 2003/0162882 | A1 * | 8/2003 | Grimm | C08J 3/124 |
| | | | | 524/493 |
| 2011/0048509 | A1 * | 3/2011 | Becker | C08K 3/04 |
| | | | | 524/451 |
| 2011/0223429 | A1 * | 9/2011 | Hudson | C09J 175/04 |
| | | | | 524/588 |
| 2012/0199199 | A1 | 8/2012 | Wood et al. | |
| 2012/0304591 | A1 | 12/2012 | Cooper | |

FOREIGN PATENT DOCUMENTS

| DE | 196 32 063 C1 | 3/1998 |
|---|---|---|
| DE | 695 03 462 T2 | 4/1999 |
| DE | 198 21 355 A1 | 11/1999 |
| DE | 102 04 174 A1 | 7/2002 |
| DE | 103 38 069 B3 | 8/2004 |
| DE | 10 2006 003 935 A1 | 8/2007 |
| DE | 10 2007 045 104 A1 | 4/2009 |
| EP | 0 024 501 A1 | 3/1981 |
| EP | 0 287 025 A2 | 10/1988 |
| EP | 0 312 967 A1 | 4/1989 |
| EP | 0 434 840 A1 | 7/1991 |
| EP | 0 452 875 A1 | 10/1991 |
| EP | 0 537 660 A1 | 4/1993 |
| EP | 0 889 108 A1 | 1/1999 |
| EP | 0 916 801 A2 | 5/1999 |
| EP | 1 245 601 A1 | 10/2002 |
| EP | 2 190 919 A1 | 6/2010 |
| EP | 2 420 536 A1 | 2/2012 |
| EP | 2 277 931 B1 | 3/2012 |
| EP | 1 893 545 B1 | 8/2015 |
| EP | 2 516 576 B1 | 5/2018 |
| WO | WO 01/72922 A1 | 10/2001 |
| WO | WO 2004/081329 A2 | 9/2004 |
| WO | WO 2009/060199 A2 | 5/2009 |

(Continued)

OTHER PUBLICATIONS

International Search Report, PCT /EP2020/059132, Aug. 7, 2020, 2 pgs.
M. Roessing et al., "New polymers with a flexible backbone", Raw Materials, adhesion Adhesives & Sealants (Feb. 2011), pp. 10-13.
Römpp Chemie Lexikon. 9th Edition, Georg Thieme Verlag, 1995, pp. 3575, 3576 and 3572.
A. Ebbers, "Advancing Adhesives: Hot-Melt Adhesives are Packed to Perfection"; Adhesives Mag (Aug. 1, 2014), pp. 1-3.
A. Ebbers, "Vestoplast® for Window sealant applications", Product Portfolio (Mar. 2013), 33 pgs.
Bodo Müller and Walter Rath, "Formulierung von Kleb- und Dichtstoffen", Vinzenz Verlag (2004), pp. 54-55.

(Continued)

*Primary Examiner* — Michael L Leonard
(74) *Attorney, Agent, or Firm* — Paul D. Strain, Esq.; Strain & Strain PLLC

(57) ABSTRACT

The present invention relates to a system for the production of a sealant composite made of a primary sealing material and a curable secondary sealing material, the use of the system for the production of insulating glass or solar modules, an edge seal for the production of double-pane or multi-pane insulating glass or solar modules comprising the sealant composite and an insulating glass unit comprising at least two glass panes and the edge seal.

40 Claims, No Drawings

(56) References Cited

FOREIGN PATENT DOCUMENTS

| WO | WO 2010/094725 A1 | 8/2010 |
| WO | WO 2011/056379 A1 | 5/2011 |
| WO | WO 2011/078922 A  | 6/2011 |
| WO | WO 2012/015997 A1 | 2/2012 |
| WO | WO 2017/162839 A1 | 9/2017 |
| WO | WO 2018/054791 A1 | 3/2018 |
| WO | WO 2018/116949 A1 | 6/2018 |

OTHER PUBLICATIONS

EPO Summons to the Oral, EP Appl. No. 20717590.2/Patent No. 3947528, Nov. 14, 2024, 13 pgs.

Glaswelt, „Pu weiter auf dem Vormarsch, Interview with Ben Mol (Oct. 2000), pp. 34-35.

H. Lucke, „Aliphatische Polysulfide: ALIPS, Chemie und Technologie der ALIPS, Hüthig und Wepf Verlag (1992), p. 53.

Kömmerling, „Isolierglas-Dicktstoff GD 116, Produktinformation (Nov. 2008), pp. 1-2.

Kömmerling, „Ködispace 4SG, Produktinformation (Jan. 2012), pp. 1-2.

Ottocoll® S670, „Vertraglichkeit mit verschiedenen Randverbundmaterialien/Haftung des Klebessystems, (2019), pp. 1-3.

Randolf Karrer, „EU-Richtlinie für Polyurethan im Randverbund, Glas+Rahmen (Dec. 2013), 3 pgs.

Randolf Karrer; Korean Office Action, Appl. No. 10-2021-7035682, Dec. 2, 2024, including English translation and pending claims.

Saint-Gobain Glass Solutions, „Nachweis Zeitstandverhalten—Mehrscheiben-Isolierglas nach DIN EN1279-3, ift Rosenheim (Aug. 26, 2011), pp. 1-5.

Silicone—Chemie und Technologie, „Haftvermittler/Haftschichten, Vulkan-Verlag, Essen (1989), p. 34.

* cited by examiner

SYSTEM FOR PRODUCING A SEALING COMPOUND FOR INSULATING GLASS

CROSS-REFERENCE TO RELATED PATENT APPLICATIONS

This application is a National Stage of International Application No. PCT/EP2020/059132, filed Mar. 31, 2020, which is based upon and claims the benefit of priority from prior German Patent Application No. 10 2019 204 773.4, filed Apr. 3, 2019, the entire contents of all of which are incorporated herein by reference in their entirety.

The present invention relates to a system for producing a sealant composite made of a primary sealing material and a curable secondary sealing material, the use of the system for producing insulating glass or solar modules, an edge seal for producing double-pane or multi-pane insulating glass or solar modules comprising the sealant composite, and an insulating glass unit comprising at least two glass panes and the edge seal.

Insulating glass consists of two glass panes separated from each other by a spacer or spacer frame, wherein the arrangement is usually sealed by a combination of two different sealants (a so-called primary sealing material and a so-called secondary sealing material). The insulating glass units can preferably be filled with various gases (e.g. noble gases such as argon, krypton or xenon, or heavy gases such as sulphur hexafluoride) to improve the heat and sound insulation.

The primary sealing material serves to seal the unit against penetrating atmospheric humidity and against emergent filling gases and is usually based on isobutylene polymers which have only low steam permeability. The primary sealing material is arranged between the surface of the spacer aligned towards the glass and the glass.

The secondary sealing material serves for elastic adhesion, fills the joint formed between the glass panes and the spacer and provides mechanical stability to the unit. The secondary sealing material is typically in the form of sealants based on polyurethane, polysulfide or silicone. These masses can be used both as single-component masses which cure by means of atmospheric humidity or atmospheric oxygen. Preferably, two-component masses that cure at room temperature are used in which one part contains the polymer component and the other part contains a crosslinker or hardener component. The secondary sealing material can additionally contain silanes for improved glass adhesion.

The combination of spacer/spacer frame, primary sealing material and secondary sealing material is usually referred to as a so-called edge seal.

The spacer is placed in the edge region of the glass panes and serves to keep the two glass panes at a defined distance during assembly of the unit. Insulating glass units with spacer frames are known. These spacers can be hollow profile rods filled with a drying agent and made of aluminium or high-grade steel, which are attached to the glass panes by means of the primary sealing material, typically a thermoplastic sealing material (such as polyisobutylene hotmelt). However, such metallic spacer frames have the disadvantage that they form a cold bridge between the glass panes of the insulating glass unit.

In order to eliminate this, recently spacer frames made of thermoplastic profiles have been used, which can be prefabricated or can be extruded, in particular directly onto one of the glass panes. Such thermoplastic spacer frames usually consist essentially of an olefinic polymer, such as polyisobutylene, which can additionally contain a drying agent. Preferably, materials are used which can be applied as a hotmelt and which solidify after cooling to form a solid mass which adheres to the glass. These spacer frames, also known as so-called thermoplastic spacer ("TPS" or "TPA"), combine the function of the spacer and the primary sealing material and thus also ensure the gas-tightness. Such systems are described, for example, in DE 695 03 462 T2 and in EP 916 801 A2. A method and a device for applying extruded thermoplastic spacer frames are described in DE 196 32 063 C1. A corresponding product is available, for example, under the name "Naftotherm-BU TPS" by the company Chemetall GmbH.

For the further curing of a TPS, it has been proposed in DE 102 04 174 A1 that the polyisobutylene material can contain crosslinking groups, such as functional silane groups, for example, which contain hydrolysable functions, such as alkoxy groups.

In these systems, the edge of the spacer directed peripherally outwards is set back by a distance, generally a few millimetres, from the outer edges of the glass panes, wherein the remaining free space is filled with the secondary sealing material, which elastically adheres and seals the insulating glass units.

The adhesion to the glass is carried out essentially adhesively due to physical interactions of the polyisobutylene-based material and the glass surface.

There is often insufficient adhesion between the thermoplastic spacer and the secondary sealing material. This can have the result that the thermoplastic spacer deforms by external influences or migrates into the space between the panes (so-called "garland effect"), which can lead to the loss of adhesion between the spacer and the glass pane, with the result that the entire unit is no longer gas tight. However, even if the gas-tightness is not lost, in any case a visual impairment and thus an aesthetic problem emerges.

EP 2 190 919 A1 describes the formation of chemical bonds via hydrolysis-condensation reactions between silane-modified polymer components of a primary sealing material based on polyisobutylene and chemically active hydroxyl groups of the glass surface as well as possible bonds at the interface to silicone as a secondary sealing material. Such thermoplastic spacers containing functional groups are also referred to as so-called reactive TPS or TPA or reactive-TPS or reactive-TPA.

Due to the functional or reactive groups, corresponding reactive-TPS or -TPA systems have only limited storage stability or require production, storage and handling/application under exclusion of (air) humidity.

Finally, there are opposing requirement profiles for a reactive-TPS or -TPA: on the one hand, the activity of the functional or reactive groups must be guaranteed in order to ensure a good glass adhesion during application; on the other hand, a sufficient amount of drying agent must be incorporated in order to ensure the function for drying the pane intermediary space.

Thus, the object of the present invention is the provision of an improved sealant composite made of a primary sealing material and a curable secondary sealing material based on polyurethane or polysulfide or based on corresponding silane-terminated/modified polyurethanes or polysulfides, in particular with an improved adhesion between the primary and secondary sealing material, simplified handling and improved storage stability of the components and a chemical adhesion of the sealant composite to the glass surface.

The object is achieved by a system for producing a sealant composite of a primary sealing material and a curable secondary sealing material, comprising at least three separately stored components (A, B1, B2), wherein the component (A) is the primary sealing material, comprising:
a) about. 30-85% by weight of at least one olefinic polymer;
b) about 2-35% by weight of at least one polymer modified with reactive groups;
c) about 5-65% by weight of at least one filler;
d) about 5-25% by weight of at least one drying agent;
e) about 0-3% by weight of at least one stabiliser;
and the secondary sealing material is a sealing material based on polyurethane or polysulfide, obtainable from a polymer component (B1) and a hardener component (B2),
wherein the secondary sealing material contains a catalyst and/or an initiator, by means of which the reactive groups in the primary sealing material can be activated upon contact with the secondary sealing material.

It was surprisingly found that the sealant composite according to the present invention has a strong degree of adhesion between the primary sealing material and the secondary sealing material. In addition, a good degree of adhesion to the glass surface is observed.

Without being bound by a certain theory, it is assumed that via the contact between the primary sealing material and secondary sealing material at the interface, an activation of the reactive groups of the primary sealing material by the catalyst contained in the secondary sealing material takes place, such that a reaction between the reactive groups of the primary sealing material, in particular hydrolysable silyl alkoxy groups, and the functional groups of the secondary sealing material takes place at the interface during the curing thereof (crosslinking). In addition, a bonding of the primary sealing material to the glass surface occurs, in particular via the hydroxyl groups of the glass surface. This assumption is supported by the adhesion that occurs, in particular in the case of polyurethane as the secondary sealing material, since there the polymer component and the crosslinking component are essentially free of water.

The glass surface usually has OH functionalities. Depending on the secondary sealing material used, it has SH functionalities (polysulfide), OH or NCO functionalities (polyurethane). Accordingly, the reactive groups are preferably suitable for reacting with OH, SH or NCO functionalities.

According to a preferred embodiment of the invention, the reactive groups of the modified polymers b) are selected from at least one terminal group or a group statistically distributed within the polymer framework, selected from the group comprising alkoxy silyl, carboxyl, amino, epoxy, vinyl, methacryl, methacryloxyl, carbamate, mercapto, glycidoxy, hydroxyl, isocyanate and combinations thereof. In particular, the amino and hydroxyl groups can optionally be substituted, e.g. with alkyl, in particular in each case with 1 to 8 carbon atoms in the alkyl moiety.

It is further preferred that the reactive groups are selected from at least one terminal alkoxy silyl group or alkoxy silyl group distributed statistically inside the polymer framework, in particular in each case with 1 to 8 carbon atoms in the alkoxy moiety, preferably di- or tri-oxysilyl groups, particularly preferably di- or tri-methoxy or -ethoxy silyl.

An example for a corresponding polymer b) is an amorphous poly-alpha-olefin modified with alkoxy silyl groups, e.g. Vestoplast® 206 (company Evonik). The production of silane functional polyisobutylenes or polybutadienes is described in EP-A-287025, EP-A-452875, EP-A-434840, EP-A-537660, EP-A-312967.

Advantageously, the polymer b) modified with reactive groups is bi-, tri- or multifunctional, preferably bifunctional. For example, a bifunctional polymer has an alkoxy silyl group for binding to OH functions, e.g. to the glass surface, and a reactive organofunctional group, such as an amino-, epoxy- or isocyanate group, for binding to an NCO or OH function of a polyurethane. In the case of polysulfide, in addition to an alkoxy silyl group for bonding to OH functions, a reactive organofunctional group, such as an epoxy or vinyl group, for example, can be contained for binding to an SH function of a polysulfide. The amino, epoxy and vinyl groups can simultaneously serve to bond to the olefinic polymer a), when this is e.g. a polyolefin, polyether or polyacrylate.

Preferably, the polymer b) has an alkoxy silyl group, preferably trialkoxysilyl, in particular trimethoxysilyl, and a further group selected from carboxyl, amino, epoxy, vinyl, methacryl, methacryloxyl, carbamate, mercapto, glycidoxy, hydroxyl and isocyanate. The alkoxy silyl group and/or the further group are preferably terminal.

With a tri- or multifunctional polymer b) modified with reactive groups, for example in addition to an alkoxy silyl group for bonding to OH functions of the glass surface and an epoxy or vinyl group for bonding to an SH function of a polysulfide or an amino-, epoxy or isocyanate group for bonding to an NCO or OH function of a polyurethane, yet further reactive organofunctional groups are present, such as methacryloxy or methacryl groups, when the olefinic a) is, e.g. polyolefin, polyester or polyacrylate.

Alternatively, at least two bifunctional polymers b) modified with reactive groups can advantageously be used.

Corresponding polymers b) modified with reactive groups can be produced, for example, via the so-called silane-terminated/-modified polymers (STP/SMP) technology (M. Roessing, B. Brugger, Neue Polymere mit flexiblem Rückgrat, adhäsion (*New polymers with flexible spine, adhesion*) March 2011, S.24-27, https://silane-modified-polymers.evonik.com/product/break-thru/downloads/adhaesion-2011-03-silanmodifizierte-kleb-und-dichtstoffe.pdf). EP 2277931 B1 also describes polyolefins modified with reactive groups and the production thereof.

Alternatively, the polymers b) modified with functional groups can also be organofunctional silanes (e.g. Genosil®, company Wacker Chemie AG), preferably on a polymeric or mineral carrier system (e.g. Deolink®/FamaSil, company DOG Chemie). In this case, firstly a reaction with the organofunctional group of the silane having a reactive group, e.g. a terminal group, of the olefinic polymer a) and/or the secondary sealing material is advantageously carried out by forming a silane-terminated polymer (STP technology). The silane-terminated polymer obtained then enters into a chemical bond e.g. with OH functions of the glass surface and/or the secondary sealing material.

The at least one olefinic polymer a) is present in an amount of about 30-85% by weight, preferably about 30-70% by weight, particularly preferably about 35-60% by weight, in particular about 35-50% by weight based on the weight of the component (A).

The polymers a) have a number average molecular weight (Mn) ranging from about 400-600000, preferably ranging from about 5000 to 300000 and are preferably selected from the homo- or co-polymers, composed of the monomers ethylene, propylene, n-butene and the higher homologues and isomers thereof, from functional vinyl compounds such as vinyl acetate, vinyl chloride, styrene, α-methyl styrene, and from unsaturated acid derivatives, such as acrylic acids, methacrylic acids, acrylates, methacrylates, acryl nitrile.

In an embodiment of the invention, the olefinic polymers a) are selected from the group comprising polyisobutylene, polybutylene, butyl rubber (polyisobutylene isoprene), styrene block co-polymers, in particular SBS, SIS, SEBS, SEPS, SIBS, SPIBS, also in modified form, and amorphous co- and/or terpolymers of α-olefins (APAO).

The at least one polymer b) modified with reactive groups is present in an amount of about 2-35% by weight, preferably about 4-25% by weight, in particular about 5-15% by weight based on the weight of the component (A).

The polymer framework of the modified polymer b) is preferably selected from homo- and co-polymers, composed of the monomers ethylene, propylene, n-butene and the higher homologues and isomers thereof, from functional vinyl compounds, such as vinyl acetate, vinyl chloride, styrene, α-methyl styrene, and from unsaturated acid derivatives, such as acrylic acids, methacrylic acids, acrylates, methacrylates, acryl nitrile.

The polymer framework of the modified polymer b) is preferably also selected from the group comprising polyisobutylene, polybutylene, butyl rubber (polyisobutylene isoprene), styrene block co-polymers, in particular SBS, SIS, SEBS, SEPS, SIBS, SPIBS, also in modified form, and amorphous co- and/or terpolymers of α-olefins (APAO), polyester, polyether and polyether-polyester preferably completely or partially based on renewable raw materials, such as e.g. DYNACOLL® products by company Evonik or Rokrapol® products by company Robert Kraemer GmbH & Co. KG. The number average molecular weight (Mn) of the polymer b) modified with reactive groups is preferably in the range of from about 100 to 100000, in particular about 100 to 15000, very particularly about 5000-15000.

The fillers are additives in powder form. The at least one filler c) is present in an amount of about 5-65% by weight, preferably about 10-45% by weight, in particular about 20-45% by weight based on the weight of the component (A).

The fillers c) are preferably fine particles and essentially inert. In the context of the invention, fine particles are understood to mean a minimum average particle diameter in the range of about 20-100 nm and a maximum average particle diameter in the range of about 0.8-3 μm.

Advantageously, the fillers are selected from the group comprising carbon blacks, precipitated or pyrogenic silica, optionally surface-treated precipitated or ground chalk, zeolites, bentonites, magnesium carbonate, diatomite, alumina, clay, silicates, such as, in particular, kaolin, talc and mica, barite, titanium dioxide, iron oxide, zinc oxide, sand, quartz, flint, aluminium powder, zinc powder, glass powder/fibres, carbon fibres, graphite, silicon oxides and mixtures thereof. Corresponding fillers are familiar to the person skilled in the art and are commercially available, e.g. Printex® (company Orion Engineered Carbons), Raven® (company Birla Carbon), Black Pearls® (company Cabot), Omyacarb® (company Omya GmbH), Calprec® (company Calcinor), Imerseal® (company Imerys Carbonates), Aerosil® (company Evonik), Cabosil® (company Cabot Corporation).

The at least one drying agent d) is a physically or chemically water-binding compound. The at least one drying agent d) is present in an amount of about 5-25% by weight, preferably about 10-25% by weight, in particular about 10-20% by weight based on the weight of the component (A).

The drying agents d) are preferably selected from water-binding fillers, such as silica gel, calcium oxide or zeolites with defined pore diameters, in particular type 3 A to 10 A molecular sieves. Corresponding drying agents are familiar to the person skilled in the art and are commercially available, e.g. Kezadol PCI (company Kettlitz), CALFRIT® (company Calcinor), PURMOL® (company Zeochem AG).

Polymeric materials are generally sensitive to the effect of oxygen and heat, which lead to a so-called ageing by changing the strength, ductility and hardness. Thus, according to the invention, using a least one stabiliser (or anti-ageing agent) is preferably provided. The at least one stabiliser e) is present in an amount of about 0-3% by weight, preferably about 0.1-2% by weight, in particular about 0.2-1% by weight based on the weight of the component (A).

The at least one stabiliser e) is preferably selected from the group comprising sterically hindered phenols, thioethers, mercapto compounds, phosphorous esters, benzotriazoles, benzophenones, sterically hindered amines (hindered amine light stabilizers, HALS) and ozone protection agents. Corresponding anti-ageing agents are familiar to the person skilled in the art and are commercially available, e.g. Eversorb® (company Everlight Chemical Industrial Corp.), Evernox® (company Everspring Chemical Co., Ltd.), Tinuvin® (company BASF).

The component (A) can additionally contain about 0.1-2% by weight, preferably about 0.2-1.5% by weight based on the weight of the component (A) of organofunctional silanes as adhesion-promoting agents and/or crosslinkers, for example 3-glycidoxy-propyltrialkoxysilane, 3-acryloxy-propyltrialkoxysilane, 3-aminopropyltrialkoxysilane, vinyltrialkoxysilane, N-aminoethyl-3-aminopropyl-methyl-dialkoxysilane, phenylaminopropyltrialkoxysilane, aminoalkyltrialkoxydisilane or i-butylmethoxysilane. The methoxy or ethoxy groups are particularly preferred as the alkoxy group.

In order to improve the storage stability and application, one embodiment of the invention provides for a deactivation of the component (A), i.e. the reactive-TPS, by adding water-binding substances, such as organic silanes, for example vinyltrimethoxysilanes (VTMO), diaminomethoxysilanes (DAMO), ranging from about 0.1 to 10% by weight, preferably about 0.2 to 5% by weight, in particular about 0.5 to 2% by weight based on the component (A) or by physically drying the fillers c), e.g. in a contact dryer, such as a paddle dryer, or in a vacuum dryer, such as fluidised bed dryer, in order to prevent crosslinking or curing to the greatest possible extent during storage and application.

The activation of the reactive-TPS takes place by physical contact with the secondary sealing material, which contains the catalyst/initiator and, optionally, activators, such as water or water containing raw materials such as chalks and pyrogenic silica (e.g. Aerosil® company Evonik) and water releasing raw materials, e.g. hydrates such as calcium sulphate dihydrate, or salts containing crystal water, which acidly or basically react in aqueous solution, such as salts in which the anion is selected from phosphate, sulphate, metasilicate, hydroxide sulphate and hydroxide phosphate, or salts which contain an acidly or alkaline effective cation, selected from metal cations of metals of main group III, auxiliary group VIII and ammonium, in particular acidic salts of the aluminium, in particular the sulphate, the chloride and the nitrate, the alums of the ammonium ion and the alkaline metals, in particular the sodium and the potassium, salts of the iron, such as iron II sulphate, iron III phosphate, ferric alum of the ammonium ion, and ammonium iron II sulphate, basic salts, such as trisodium phosphate, ammonium alums, tri-magnesium phosphate and sodium metasilicate, or hydroxides, such as magnesium hydroxide, in the change of from about 0.1 to 20% by weight, preferably about 1 to 10% by weight, in particular about 2 to 5% by weight.

As the catalyst and/or initiator, by means of which the reactive groups can be activated in the primary sealing material upon contact with the secondary sealing material, in particular all known compounds can be used which can catalyse the hydrolytic cleavage of the hydrolysable groups of the silane moieties, and the subsequent condensation of the Si—OH group to form siloxane moieties (crosslinking reaction or adhesion-promoting agent function). The catalyst and/or initiator is preferably selected from the group comprising titanates, such as tetrabutyl titanate or titanium tetraacetylacetonate; bismuth compounds, such has bismuth-rtis-2-ethylhexanoate; tin compounds, such as tin carboxylates, such as dibutyltin dilaurate (DBTL), dibutyltin diacetate or dibutyltin diethyl hexanoate; tin oxides, such as dibutyltin oxide and dioctyl tin oxide; tin octylate, dibutyltin dimaleate, dibutyltin diacetyl acetonate and reaction products of dibutyltin oxide and esters of phthalic acids; organoaluminium compounds, such as aluminium trisacetylacetonate; chelate compounds, such as zirconium tetraacetylacetonate, titanium tetraacetylacetonate; amine compounds or their salts with carboxylic acids, such as octylamine, cyclohexylamine, benzylamine, butylamine, dibutylamine, monoethanolamine, triethanolamine, diethylenetriamine, triethylenetetramine, triethylenediamine, guanidine, morpholine, N-methylmorpholine and 1,8-diazabicyclo-(5,4,0)-undecene-7 (DBU), silane adhesion-promoting agents with amino groups, organic sulphonic acids such as p-toluene sulphonic acid, manganese compounds, such as manganese (IV) oxide; and mixtures thereof. Corresponding catalysts are familiar to the person skilled in the art and are commercially available, for example, Polycat®, Dabco®, COSMOS® (company Evonik), TIB KAT® (company TIBChemicals), K-KAT® (company King Industries), REAXIS (company Reaxis).

The catalyst/initiator is contained in at least one of the two components (B1) or (B2) of the secondary sealing material, preferably in component (B1). The amount of catalyst/initiator is about 0.01-5% by weight, preferably about 0.05-4% by weight, particularly preferably about 0.05-2% by weight, based on the respective component (B1) or (B2).

A preferred embodiment of the invention is free from metal catalysts/initiators, another preferred embodiment uses mixtures of several catalysts/initiators.

The use of sealants based on polyurethane or polysulfide as the secondary sealing material in sealant composites, in particular for producing insulating glass, is familiar to the person skilled in the art (e.g. WO 2018/054791 A, WO 2009/060199 A, WO 2017/162839 A1). Similarly, the person skilled in the art is familiar with the production of sealants based on polyurethane or polysulfide (e.g. WO 2018/116949 A1, WO 2011/078922 A, WO 2017/162839 A1). Corresponding products are commercially available, for example IGK 130, IGK 330, company IGK Isolierglasklebstoffe GmbH).

In the context of the present invention, the sealant based on polyurethane or polysulfide is obtainable from a polymer component or prepolymer component (B1) and a crosslinker or hardener component (B2), i.e. from a two-component system. It would also be conceivable to use them as single-component compounds, which then cure by means of atmospheric humidity or atmospheric oxygen.

In principle, polyurethanes are synthesised by reacting various isocyanates with various polyols.

According to an embodiment of the invention, in which the secondary sealing material is a sealing material based on polyurethane, the polymer component (B1) is selected from the group comprising diols, polyols, polyester polyols, polyester/polyether polyols, preferably based completely or partially on renewable raw materials (e.g. so-called natural oil-based polyols (NOBP), for example based on soybean oil, sunflower oil, rapeseed oil, see e.g. EP 2 516 576 B1, Elevance C18 (company Elevance Renewable Sciences), Neukapol (company Altropol Kunststoff GmbH), Durez-Ter (company SBHPP)) and with available acidic hydrogen (such as OH, SH, NH groups, etc.)-modified polyolefins with a molecular weight range of from about 500 to 10000, preferably from about 1000 to about 4000 and functionality of from about 2 to 4, preferably from about 2 to 3, and the hardener component (B2) is selected from the group comprising mono-, di-, tri- and polyisocyanates, such as benzyl isocyanate, toluene isocyanate, phenyl isocyanate and alkyl isocyanates, in which the alkyl group contains 1 to 12 carbon atoms, aromatic, cycloaliphatic and aliphatic isocyanates such as m-phenylene diisocyanate, toluene 2-4 diisocyanate, toluene 2-6-diisocyanate, isophorone diisocyanate, 1,3- and/or 1,4-bis-(isocyanatomethyl) cyclohexane (including cis- or trans-isomers), hexamethylene-1,6-diisocyanate, tetramethylene-1,4-diisocyanate, cyclohexane-1,4-diisocyanate, hexahydrotoluene diisocyanate, methylenebis(cyclohexane isocyanate) (H12MDI), naphthylene-1,5-diisocyanate, methoxyphenyl-2,4-diisocyanate, diphenylmethane-4,4'-diisocyanate, 4,4'-biphenylene diisocyanate, 3,3'-dimethoxy-4,4'-biphenyl diisocyanate, 3,3'-dimethyl-4-4'-biphenyl diisocyanate, 3,3'-dimethyldiphenylmethane-4,4'-diisocyanate, 4,4', 4"-triphenylmethane triisocyanate, polymethylene polyphenyl isocyanate (PMDI), toluene-2,4,6-triisocyanate and 4,4'-dimethyldiphenylmethane-2,2', 5,5'-tetraisocyanate, the derivatives thereof comprising biuret, urea, carbodiimide, allophanate and/or isocyanurate groups, and mixtures thereof.

According to the invention, corresponding silane-terminated polyurethanes are also suitable. Such polyurethanes are familiar to the person skilled in the art (e.g. EP 1 245 601 A1, WO 2010/094725 A1 and WO 2017/162839 A1).

The volume ratio of polymer component (B1) to hardener component (B2) is in the range of from 100:8 to 100:12, preferably 100:9 to 100:11, in particular 100:10.

In the context of the present invention, a polysulfide is understood to mean a polymer, which has thioether groups. The polysulfides can be linear or branched or they can also be crosslinked. In addition to the thioether groups, the polysulfides used according to the invention can also have further functional groups in the main chain or in a side chain. Further functional groups are, in particular, ether groups, aromatic groups, hydroxyl or epoxy groups, or urethane groups. The polysulfides used according to the invention are preferably polymeric alkyl thioethers, wherein the alkyl groups can be linear or branched. Polysulfides are produced, in particular, by the polycondensation of alkali polysulfides, e.g. sodium pentasulfide, with alkyl dihalides, such as e.g. 1,2-dichloroethane and bis(2-chloroethoxy)methane. Trihalides, such as 1,2,3-trichloropropane, can also be added for crosslinking.

The properties of the polysulfides depend in particular on the type of alkyl radical, the sulfur content and the molecular weight, and the crosslinking density of the polysulfide. The molecular weights of the polysulfides used according to the invention are preferably in the range of from about 1000 to 8000 g/mol. The crosslinking density influences the hardness of the polysulfides, with the crosslinking taking place, for example, via sulfur bridges by reacting terminal mercapto groups. According to the invention, the crosslinking density is in the range of from about 0.01 to 10 mol %, preferably about 0.02 to 5 mol %, in particular about 0.05 to 2 mol %.

According to an embodiment of the invention, in which the secondary sealing material is a sealing material based on polysulfide, the polymer component (B1) is selected from the group comprising alkali polysulfides, such as sodium pentasulfide, polysulfide polymers with a molecular weight range of from about 500 to 8000, preferably from about 1000 to about 4000, of the general formula HS-(RSS)-RSH, in which R is a hydrocarbon moiety, oxahydrocarbon moiety or thiahydrocarbon moiety, such as an ethyl formal moiety, butyl formal moiety, ethyl ether moiety or butyl ether moiety. If desired, in addition to these thiol-terminated liquid polythiopolymers, some polysulfide polymers in which the thiol-terminated groups have been converted into hydroxyl-terminated groups by treatment with heat and acid can also be blended.

According to an embodiment, the hardener component (B2) is selected from the group comprising an oxidative hardener such as epoxides, oxidising agents such as manganese (IV) oxide, lead oxide, alkyl dihalides, trihaloalkyl compounds, basic amine catalysts, such as a tertiary amine catalyst, such as tris-(dimethylaminomethyl)phenol, a thiuram compound, such as dipentamethylene thiuram tetrasulfide (DPTT), and molecular sulfur.

According to the invention, corresponding silane-terminated polysulfides are also suitable. Such polysulfides are familiar to the person skilled in the art (e.g. S. Witzel, Synthese neuer funktioneller Polysulfid-Telechele und deren industrielle Applikation (*synthesis of new functional polysulfide telechelics and their industrial application*), dissertation, 2007, https://www.db-thueringen.de/servlets/MCR-FileNodeServlet/dbt_derivate_00011522/Dissertation.pdf).

The volume ratio of polymer component (B1) to hardener component (B2) is in the range of from 100:8 to 100:12, preferably 100:9 to 100:11, in particular 100:10.

In an embodiment of the invention, SH-terminated polymers with urethane groups, of the general structure HS-(urethane)-polymer framework-(urethane)-SH, are used as the polymer component (B1) of the sealing material based on polysulfide. In this case, the polymer component (B1) is selected from thiol- and urethane-containing compounds with a polymer framework, selected from the group comprising diols, polyols, polyester polyols, polyester/polyether polyols, preferably based completely or partially on renewable raw materials (e.g. so-called natural oil-based polyols (NOBP) e.g. based on soybean oil, sunflower oil, rapeseed oil, see e.g. EP 2 516 576 B1, Elevance C18 (company Elevance Renewable Sciences), Neukapol (company Altropol Kunststoff GmbH), Durez-Ter (company SBHPP)) and with available acidic hydrogen (such as e.g. and OH; SH, NH groups, etc.)-modified polyolefins with a number average molecular weight in the range of from about 100 to 10000, preferably from about 1000 to about 8000, in which urethane functions by reaction with isocyanates from the group comprising mono-, di-, tri- and polyisocyanates, such as benzyl isocyanate, toluene isocyanate, phenyl isocyanate and alkyl isocyanates, in which the alkyl group contains 1 to 12 carbon atoms, aromatic, cycloaliphatic and aliphatic isocyanates, such as m-phenylene diisocyanate, toluene 2-4 diisocyanate, toluene-2-6-diisocyanate, isophorone diisocyanate, 1,3- and/or 1,4-bis(isocyanatomethyl)cyclohexane (including cis- or trans-isomers), hexamethylene-1,6-diisocyanate, tetramethylene-1,4-diisocyanate, cyclohexane-1,4-diisocyanate, hexahydrotoluene diisocyanate, methylenebis (cyclohexane isocyanate) (H12MDI), naphthylene-1,5-diisocyanate, methoxyphenyl-2,4-diisocyanate, diphenylmethane-4,4'-diisocyanate, 4,4'-biphenylene diisocyanate, 3,3'-dimethoxy-4,4'-biphenyl diisocyanate, 3,3'-dimethyl-4-4'-biphenyl diisocyanate, 3,3'-dimethyldiphenylmethane-4, 4'-diisocyanate, 4,4', 4"-triphenylmethane triisocyanate, polymethylene polyphenyl isocyanate (PMDI), toluene-2,4, 6-triisocyanate and 4,4'-dimethyldiphenylmethane-2,2', 5,5'-tetraisocyanate, and the derivatives thereof which contain biuret, urea, carbodiimide, allophanate and/or isocyanurate groups, and mixtures thereof, are introduced, and terminal thiol groups are present, preferably in the form of difunctional thiol-containing groups which are bonded to the urethane function via an alkyl group with 1 to 12 carbon atoms and contain at least one thiol function and a further function selected from hydroxy, epoxy and amino.

According to an embodiment of the invention, the secondary sealing material can additionally contain excipients and additives, preferably selected from the group comprising plasticisers, such as mineral oils, white oils, paraffinic hydrocarbons, phthalates, adipates and plasticisers based on natural oils, in particular from seeds or nuts, such as soybean oil, linseed oil, coconut oil, palm oil, olive oil, cottonseed oil or castor oil, which can be chemically modified, e.g. by epoxidation, acylation or esterification, such as soy-based epoxy fatty acid methyl esters (EFAME) or acetylated stearates (e.g. WO 2012/015997 A1), stabilisers such as antioxidants, UV stabilisers or hydrolysis stabilisers; fillers, pigments such as carbon black, precipitated or pyrogenic silica, optionally surface-treated precipitated or ground chalk, zeolites, bentonites, magnesium carbonate, diatomite, alumina, clay, kaolin, talc, barite, titanium dioxide, iron oxide, zinc oxide, sand, quartz, flint, mica, aluminium powder, zinc powder, glass powder/fibres, carbon fibres, graphite, silicates, silicon oxides; diluents or reactive diluents, drying agents, such as water-binding fillers, in particular silica gel, calcium oxide or zeolites with defined pore diameters, in particular molecular sieves 3 A-10 A, hydrolysable silane compounds; adhesion-promoting agents, in particular organofunctional silanes such as hydroxy-functional, (meth)acryloxy-functional, mercapto-functional, amino-functional or epoxy-functional silanes; fungicides, flame retardants, catalysts, such as manganese compounds, such as manganese (IV) oxide, rheological auxiliaries, colour pigments or colour pastes, and mixtures thereof. These can be contained in the polymer component (B1) and/or the hardener component (B2).

Typically, the polymer component (B1) of the secondary sealing material is composed of:
a) about 4-30% by weight, preferably about 6-20% by weight, of at least one polymer (PU-based: polyol, PS-based: polysulfide, SH-terminated polymer with urethane groups);
b) about 50-80% by weight, preferably about 55-75% by weight, of at least one filler;
c) about 10-30% by weight, preferably about 12-20% by weight, of at least one plasticiser;
d) about 0-10% by weight, preferably about 0-5% by weight, of at least one drying agent;
e) about 0-5% by weight, preferably about 0.05-4% by weight, of at least one catalyst;
f) about 0-3% by weight, preferably about 0.1-2% by weight, of at least one stabiliser.

Typically, the hardener component (B2) is composed of:
a) about 5-50% by weight, preferably about 10-40% by weight, of at least one crosslinker;
b) about 5-50% by weight, preferably about 10-45% by weight, of at least one filler;

c) about 30-60% by weight, preferably about 35-55% by weight, of at least one plasticiser;
d) 0-10% by weight, preferably about 0-5% by weight, of at least one drying agent;
e) about 0-5% by weight, preferably about 0-4% by weight, of at least one catalyst;
f) 0-3% by weight, preferably about 0.1-2% by weight, of at least one stabiliser.

The catalyst/initiator, however, is contained in at least one of the two components (B1) or (B2) of the secondary sealing material, preferably in component (B1).

The polymer component (B1) can consist exclusively of the corresponding polymer and the catalyst/initiator.

If the catalyst/initiator is present in the hardener component (B2), the polymer component (B1) can also consist exclusively of the corresponding polymer.

According to the invention, it is preferred that component (A) is free of catalyst in the stored state. According to an embodiment, the component (A) in the stored state contains 0.001 to 1% by weight, preferably 0.01 to 0.1% by weight, of catalyst selected from the group comprising titanates, such as tetrabutyl titanate or titanium tetraacetylacetonate; bismuth compounds, such as bismuth tris-2-ethylhexanoate; tin compounds, such as tin carboxylates, such as dibutyltin dilaurate (DBTL), dibutyltin diacetate or dibutyltin diethylhexanoate; tin oxides, such as dibutyltin oxide and dioctyl tin oxide; tin octylate, dibutyltin dimaleate, dibutyltin diacetylacetonate and reaction products of dibutyltin oxide and esters of phthalic acid; organoaluminium compounds, such as aluminium trisacetylacetonate; chelate compounds such as zirconium tetraacetylacetonate, titanium tetra-acetylacetonate; amine compounds or the salts thereof with carboxylic acids, such as octylamine, cyclohexylamine, benzylamine, butylamine, di-butylamine, monoethanolamine, triethanolamine, diethylenetriamine, triethylenetetramine, triethylenediamine, guanidine, morpholine, N-methylmorpholine and 1,8-diazabicyclo-(5,4,0)-undecene-7 (DBU), silane adhesion-promoting agents with amino groups and mixtures thereof.

The primary sealing material (component (A)), the secondary sealing material and its components (B1) and (B2) can be produced by mixing the ingredients using known devices. Optionally, the mixing can be performed under inert gas or under vacuum. It may be necessary to carry out the mixing of the ingredients at elevated temperature, such that a melt of one or more ingredients is present. It is also possible to produce corresponding compositions continuously in an extruder. The sequence of addition and mixing depends on the viscosity, consistency and amount of the individual ingredients. The solids should be evenly dispersed in the liquid ingredients. Good mixing must be ensured so that no separation of individual ingredients can occur. The method of production is known in principle; the person skilled in the art can easily determine this depending on the selection of raw materials. The two components (B1) and (B2) of the secondary sealing material are mixed in a mixing apparatus shortly before application. The mixing and application temperature for the primary sealing material (component (A)) is advantageously between about 70 and 200° C., preferably between about 100 and 135° C. The mixing temperature for producing the respective components (B1) and (B2) for the secondary sealing material is advantageously between about 20 and 100° C., preferably between about 30 and 80° C. The mixing or application temperature for the secondary sealing material obtained (mixture of components (B1) and (B2)) is between about 10 and 40° C., preferably between about 15 and 30° C., in particular between about 20 and 25° C.

The invention also relates to the use of the system according to the invention for the production of insulating glass for windows, conservatories, structural glazing and roof glazing; for glazing in land, water and air vehicles and for the production of solar modules.

A further object of the invention is an edge seal for the production of double-pane or multi-pane insulating glass or solar modules, wherein a primary sealing material and a secondary sealing material are provided, wherein the primary sealing material and the secondary sealing material are available in the form of a sealant composite obtainable from the system according to the invention.

The sealant composite according to the invention allows large distances between the panes of up to more than 20 mm, e.g. 20-30 mm, in particular up to 25 mm, preferably 22 mm.

A further object of the invention is an insulating glass unit comprising at least two glass panes and an edge seal according to the invention.

The method for producing an insulating glass unit by using the system according to the invention comprises:
applying the primary sealing material (component (A)) to the edge region of a glass sheet by means of a suitable apparatus (e.g. extruder or barrel pump);
placing a second glass sheet congruently on the sealing composite;
pressing the insulating glass unit to the predetermined thickness;
mixing the two components (B1) and (B2) of the secondary sealing material and applying the sealant into the joint formed between the glass panes and the primary sealing material;
optionally repeating the process steps in the case of multi-pane insulating glass with more than two glass panels.

The insulating glass unit, produced with the system or with the edge seal according to the invention, can also be filled predominantly with at least one noble gas (e.g. argon, krypton or xenon), at least one heavy gas (e.g. sulphur hexafluoride) or mixtures of the two types of gas in order to improve the thermal insulation and sound insulation properties.

The invention is to be explained by means of the following examples, but without being limited to the specifically described embodiments. Unless otherwise stated or unless the context necessarily indicates otherwise, percentages relate to the weight, in case of doubt to the total weight of the mixture.

EXAMPLE 1 PRIMARY SEALING MATERIAL

The primary sealing material (component (A)) was obtained by mixing the individual ingredients in a laboratory kneader at a temperature of 120° C.:

|  |  | % by weight |
|---|---|---|
| Oppanol N50 (Company BASF) | (a) olefinic polymer | 2.0 |
| Oppanol B15 (Company BASF) | (a) olefinic polymer | 25.0 |
| Oppanol B10 (Company BASF) | (a) olefinic polymer | 10.0 |
| Vestoplast 206 (Company Evonik) | (b) polymer modified with reactive groups | 10.0 |
| Precarb 400 (Company Schaefer Kalk) | (c) filler | 20.0 |

| | | % by weight |
|---|---|---|
| Printex V (Company Orion) | (c) filler | 25.0 |
| Kezadol PCI (Company Kettlitz) | (d) drying agent | 5.0 |
| VTMO (Company Evonik) | (d) drying agent | 3.0 |

EXAMPLE 2 SECONDARY SEALING MATERIAL (POLYURETHANE)

The polymer component (B1) was obtained by mixing the individual ingredients in a laboratory speed mixer at a temperature of from 25° C. to 40° C.:

| | | % by weight |
|---|---|---|
| Poly-BD (Cray Valley) | (a) polyol | 17.2 |
| Hakuenka CCR (Shiraishi Calcium) | (b) filler | 27.9 |
| Omyacarb 3 (Omya) | (b) filler | 37.1 |
| Jayflex ™ DINP (ExxonMobil Chemical) | (c) plasticiser | 16.7 |
| PURMOL ® (Company Zeochem AG) | (d) drying agent | 1.0 |
| TIB KAT 218 (TIB Chemicals) | (e) catalyst | 0.1 |

The hardener component (B2) was obtained by mixing the individual ingredients in a laboratory speed mixer at a temperature of from 25° C. to 40° C.:

| | | % by weight |
|---|---|---|
| Ongronat 2100 (BorsodChem) | (a) crosslinker | 22.0% |
| Printex V (Orion) | (b) filler | 11.0% |
| Santicizer 261 A (Valtris) | (c) plasticiser | 55.0% |
| PURMOL ® (Company Zeochem AG) | (d) drying agent | 5.5% |
| Dynasylan GLYMO (Evonik) | adhesion-promoting agent | 6.5% |

EXAMPLE 3 SECONDARY SEALING MATERIAL (POLYSULFIDE)

The polymer component (B1) was obtained by mixing the individual ingredients in a laboratory speed mixer at a temperature of from 25° C. to 40° C.:

| | | % by weight |
|---|---|---|
| Polyethylene glycol with a molecular weight of 800 Da with terminal SH groups | (a) polymer | 20.0% |
| Hakuenka CCR (Shiraishi Calcium) | (b) filler | 15.0% |
| Omyacarb 3 (Omya) | (b) filler | 44.0% |
| Jayflex ™ DINP (ExxonMobil Chemical) | (c) plasticiser | 20.0% |
| Dynasylan GLYMO (Evonik) | adhesion-promoting agent | 1.0% |

Hardener component B2 was obtained by mixing the individual ingredients in a laboratory speed mixer at a temperature of from 25° C. to 40° C.:

| | | % by weight |
|---|---|---|
| MnO2 2NG (Shepherd) | (a) crosslinker | 25% |
| Printex V (Orion) | (b) filler | 13% |
| Santicizer 261 A (Valtris) | (c) plasticiser | 60% |
| DPTT (Akrochem) | (e) catalyst | 2% |

Experiment 1: Interactions Between Reactive-TPS (Primary Sealing Material) and Polyurethane Secondary Sealing Material An insulating glass test pane with dimensions of 500×350 mm and the pane structure of 4 mm float glass/16 mm pane intermediary space/4 mm float glass is sealed with the sealing composite according to Example 1 according to the invention (primary sealing material, component (A)) as a thermoplastic spacer and with the 2-component-polyurethane from Example 2 (polymer component (B1) and hardener component (B2)) as a secondary sealing material.

The test pane produced in this way is then stored under normal climatic conditions (23° C. with 50% relative humidity). After about 2-3 weeks of storage time, a so-called "butterfly test" is carried out. In this test, a glass pane of the test sample is cut transversely in the middle, and the glass panels are opened outwardly for a period of about 10 s. In the case of the test pane, the two panels can be folded out several times up to an angle of 270° without adhesion breakage of neither the primary sealing material nor the secondary sealing material. Then a piece of the sealing material cord (made of primary and secondary sealing material) is cut out of the test pane. It is not possible to manually separate the reactive-TPS cord from the polyurethane cord; thus, strong interactions between the primary and secondary sealing material are observed.

Experiment 2: Interactions Between Reactive-TPS (Primary Sealing Material) and Polysulfide Secondary Sealing Material A plate made of the TPS material according to Example 1 with dimensions of 100×100×4 mm is coated with the sealant composite according to Example 3 (polymer component (B1) and hardener component (B2)). The test specimens produced in this way are then stored under normal climatic conditions (23° C. with 50% relative humidity). After only 3-4 weeks, the secondary sealing material cannot be manually separated from the reactive-TPS, and thus strong interactions between the primary and secondary sealing material can be observed.

The invention also relates to all combinations of preferred embodiments, insofar as these are not mutually exclusive, in particular also to combinations of upper and lower limits of different specified ranges. For a specified range, all individual values and sub-ranges between the upper and lower limits are included and disclosed. For example, in the case of a range of from 5 to 45, the value can range from a lower limit of 5, 10, 15 or 20 to an upper limit of 30, 35, 40 or 45. The statement "about" in connection with a number or range means that at least 10% higher or lower values or 5% higher or lower values and in any case 1% higher or lower values are included.

The invention claimed is:

1. A system for producing a sealant composite, the sealant composite comprising a primary sealing material and a distinct curable secondary sealing material, the system including at least three separately stored components (A, B1, B2), wherein the component (A) is the primary sealing material, comprising:

a) about 30-80% by weight of at least one olefinic polymer;
b) about 2-35% by weight of at least one polymer modified with reactive groups;
c) about 5-65% by weight of at least one filler;
d) about 5-25% by weight of at least one drying agent;
e) about 0-3% by weight of at least one stabiliser;
wherein the distinct secondary sealing material is a sealing material based on polyurethane, obtainable from a polymer component (B1) and a hardener component (B2),
wherein the polymer component (B1) is selected from the group consisting of diols, polyols, polyester polyols, and polyolefins modified with available acidic hydrogen, and
wherein the polymer component (B2) is selected from the group consisting of isocyanates, mono-, di-, tri- and polyisocyanates, and mixtures thereof,
wherein the secondary sealing material contains a catalyst and/or an initiator, wherein the catalyst and/or initiator is selected to activate the reactive groups in the primary sealing material upon contact with the catalyst and/or initiator in secondary sealing material.

2. The system according to claim 1, wherein the reactive groups are suitable for reacting with OH, SH or NCO functionalities.

3. The system according to claim 1, wherein the reactive groups are selected from at least one terminal group or a group statistically distributed within the polymer framework, selected from the group consisting of alkoxy silyl, carboxyl, optionally substituted amino, epoxy, vinyl, methacryl, methacryloxyl, carbamate, mercapto, glycidoxy, optionally substituted hydroxyl, isocyanate and combinations thereof.

4. The system according to claim 1, wherein the reactive groups are selected from at least one terminal group or an alkoxyl silyl group statistically distributed within the polymer framework.

5. The system according to claim 1, wherein the at least one polymer b) modified with reactive groups is bifunctional.

6. The system according to claim 5, wherein the at least one bifunctional polymer b) comprises an optionally terminal alkoxy silyl, and a further optionally terminal group selected from carboxyl, amino, epoxy, vinyl, methacryl, methacryloxyl, carbamate, mercapto, glycidoxy, hydroxyl and isocyanate.

7. The system according to claim 1, wherein the at least one olefinic polymer a) is selected from homo- or co-polymers, composed of the monomers ethylene, propylene, n-butene and the higher homologues and isomers thereof, from functional vinyl compounds, and from unsaturated acid derivatives.

8. The system according to claim 1, wherein the at least one olefinic polymer a) is selected from the group consisting of polyisobutylene, polybutylene, butyl rubber (polyisobutylene isoprene), styrene block co-polymers, and amorphous co- and/or terpolymers of α-olefins (APAO).

9. The system according to claim 1, wherein a polymer framework of the at least one modified polymer b) is selected from homo- or co-polymers, composed of the monomers ethylene, propylene, n-butene and the higher homologues and isomers thereof, from functional vinyl compounds, and from unsaturated acid derivatives.

10. The system according to claim 1, wherein a polymer framework of the at least one modified polymer b) is selected from the group consisting of isobutylene, polybutylene, butyl rubber (polyisobutylene isoprene), styrene block co-polymers and amorphous co- and/or terpolymers of α-olefins (APAO), polyester, polyether, and polyether-polyester.

11. The system according to claim 1, wherein the at least one filler c) is selected from the group consisting of carbon blacks, precipitated or pyrogenic silica, optionally surface-treated precipitated or ground chalk, zeolites, bentonites, magnesium carbonate, diatomite, alumina, clay, silicates, barite, titanium dioxide, iron oxide, zinc oxide, sand, quartz, flint, aluminium powder, zinc powder, glass powder/fibres, carbon fibres, graphite, silicon oxides and mixtures thereof.

12. The system according to claim 1, wherein the at least one drying agent d) is selected from water-binding fillers and hydrolysable silane compounds.

13. The system according to claim 1, wherein the at least one stabiliser e) is selected from the group consisting of sterically hindered phenols, thioethers, mercapto compounds, phosphorous esters, benzotriazoles, benzophenones, sterically hindered amines (HALS), and ozone protection means.

14. The system according to claim 1, wherein the catalyst and/or initiator is selected from the group consisting of titanates, bismuth compounds, tin compounds, tin oxides, organoaluminum compounds, chelate compounds, amine compounds or the salts thereof with carboxylic acids, organic sulphonic acids, manganese compounds, and mixtures thereof.

15. The system according to claim 1, wherein the polymer component (B1) and/or hardener component (B2) additionally contains expedients and additives, selected from the group consisting of plasticisers, stabilisers, fillers, pigments, diluents or reactive diluents, drying agents, adhesion-promoting agents, fungicides, flame retardants, catalysts, rheological auxiliaries, colour pigments or colour pastes, and mixtures thereof.

16. The system according to claim 1, wherein the component (A) in a stored state is free of catalysts.

17. The system according to claim 1, wherein the component (A) in a stored state contains 0.001 to 1% by weight of catalyst, selected from the group consisting of titanates, bismuth compounds, tin compounds, tin oxides, tin octylate, dibutyltin dimaleate, dibutyltin diacetyl acetonate and reaction products of dibutyltin oxide and esters of phthalic acids, organoaluminum compounds, chelate compounds, amine compounds or their salts with carboxylic acids, and mixtures thereof.

18. The system according to claim 4, wherein the reactive groups comprise 1 to 8 carbon atoms in each alkoxyl moiety.

19. The system according to claim 18, wherein the reactive groups are di- or tri-oxysilyl groups.

20. The system according to claim 19, wherein the reactive groups are di- or tri-methoxy or -ethoxy silyl.

21. The system according to claim 6, wherein polymer b) comprises an optionally terminal trialkoxysilyl.

22. The system according to claim 21, wherein polymer b) comprises an optionally terminal trimethoxysilyl.

23. The system according to claim 7, wherein the at least one olefinic polymer a) is selected from:
vinyl acetate, vinyl chloride, styrene, and α-methyl styrene; and
acrylic acids, methacrylic acids, acrylates, methacrylates, and acryl nitrile.

24. The system according to claim 8, wherein the at least one olefinic polymer a) is selected from modified or unmodified SBS, SIS, SEBS, SEPS, SIBS, and SPIBS.

25. The system according to claim 9, wherein the polymer framework of the at least one modified polymer b) is selected from
- vinyl acetate, vinyl chloride, styrene, and α-methyl styrene; and
- acrylic acids, methacrylic acids, acrylates, methacrylates, and acryl nitrile.

26. The system according to claim 10, wherein the framework of the at least one modified polymer b) is selected from modified or unmodified SBS, SIS, SEBS, SEPS, SIBS, and SPIBS.

27. The system according to claim 12, wherein the water-binding filler is selected from silica gel, calcium oxide, and zeolites with defined pore diameters corresponding with type 3 A to 10 A molecular sieves.

28. The system according to claim 15, wherein the polymer component (B1) is selected from polysulfide polymers with a molecular weight range of from about 1000 to 4000.

29. The system according to claim 15, wherein the polymer framework is completely or partially based on renewable raw materials.

30. The system according to claim 15, wherein the hardener component (B2) is selected from epoxides, manganese (IV) oxide, a tertiary amine catalyst, dipentamethylene thiuram tetrasulfide (DPTT).

31. The system according to claim 15, wherein the additives are selected from:
- mineral oils, white oils, paraffinic hydrocarbons, phthalates or adipates;
- antioxidants, UV stabilisers or hydrolysis stabilisers;
- carbon black, precipitated or pyrogenic silica, optionally surface-treated precipitated or ground chalk, zeolites, bentonites, magnesium carbonate, diatomite, alumina, clay, kaolin, talc, barite, titanium dioxide, iron oxide, zinc oxide, sand, quartz, flint, mica, aluminium powder, zinc powder, glass powder/fibres, carbon fibres, graphite, silicates, and silicon oxides;
- water-binding fillers, calcium oxide or zeolites with defined pore diameters, and hydrolysable silane compounds;
- organofunctional silanes; and
- manganese compounds.

32. The system according to claim 31, wherein the additives are selected from silica gel or zeolites with pore diameters corresponding to molecular sieves 3 A-10 A.

33. The system according to claim 31, wherein the additives are selected from hydroxy-functional, (meth)acryloxy-functional, mercapto-functional, amino-functional or epoxy-functional silanes.

34. The system according to claim 31, wherein the additive comprises a manganese (IV) oxide.

35. The system according to claim 17, wherein component (A) in the stored state contains 0.01 to 0.1% by weight of catalyst.

36. The system according to claim 17, wherein component (A) in the stored state contains a catalyst selected from:
- tetrabutyl titanate and titanium tetraacetylacetonate;
- bismuth-tris-2-ethylhexanoate;
- tin carboxylates;
- dibutyltin dilaurate (DBTL), dibutyltin diacetate or dibutyltin diethyl hexanoate;
- dibutyltin oxide and dioctyl tin oxide;
- aluminium trisacetylacetonate; and
- zirconium tetraacetylacetonate and titanium tetraacetylacetonate.

37. The system according to claim 17, wherein component (A) in the stored state contains a catalyst selected from octylamine, cyclohexylamine, benzylamine, butylamine, dibutylamine, monoethanolamine, triethanolamine, diethylenetriamine, triethylenetetramine, triethylenediamine, guanidine, morpholine, N-methylmorpholine and 1,8-diazabicyclo-(5,4,0)-undecene-7 (DBU), and silane adhesion-promoting agents with amino groups.

38. The system according to claim 1,
wherein the polymer component (B1) is based completely or partially on renewable raw materials.

39. The system according to claim 1,
wherein the hardener component (B2) comprises one or more polyisocyanates selected from the group consisting of benzyl isocyanate, toluene isocyanate, phenyl isocyanate and alkyl isocyanates, in which the alkyl group contains 1 to 12 carbon atoms, aromatic, cycloaliphatic and aliphatic isocyanates such as m-phenylene diisocyanate, toluene 2-4 diisocyanate, toluene 2-6-diisocyanate, isophorone diisocyanate, 1,3- and/or 1,4-bis-(isocyanatomethyl) cyclohexane (including cis- or trans-isomers), hexamethylene-1,6-diisocyanate, tetramethylene-1,4-diisocyanate, cyclohexane-1,4-diisocyanate, hexahydrotoluene diisocyanate, methylenebis(cyclohexane isocyanate) (H12MDI), naphthylene-1,5-diisocyanate, methoxyphenyl-2,4-diisocyanate, diphenylmethane-4,4'-diisocyanate, 4,4'-biphenylene diisocyanate, 3,3'-dimethoxy-4,4'-biphenyl diisocyanate, 3,3'-dimethyl-4-4'-biphenyl diisocyanate, 3,3'-dimethyldiphenylmethane-4,4'-diisocyanate, 4,4', 4"-triphenylmethane triisocyanate, polymethylene polyphenyl isocyanate (PMDI), toluene-2,4,6-triisocyanate and 4,4'-dimethyldiphenylmethane-2,2', 5,5'-tetraisocyanate, the derivatives thereof comprising biuret, urea, carbodiimide, allophonate and/or isocyanurate groups, and mixtures thereof.

40. The system of claim 1, wherein the primary sealing material is in the form of a reactive thermoplastic spacer (TPS).

* * * * *